Jan. 28, 1964 W. H. KAUTZ 3,119,929
HIGH CAPACITY ACCUMULATOR
Filed May 11, 1960 3 Sheets-Sheet 1
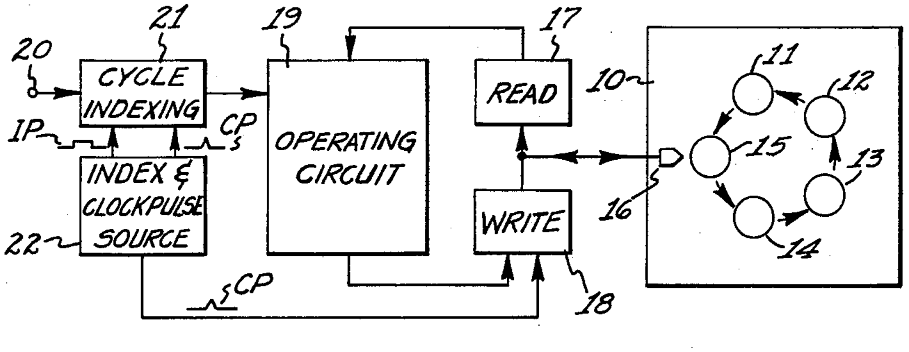
FIG. 1
CELLS
STABLE CONDITIONS REPRESENTATIVE OF NUMBERS
| | 11 | 12 | 13 | 14 | 15 |
|---|---|---|---|---|---|
| 0 | 0 | 0 | 0 | 0 | 0 |
| 1 | 1 | 0 | 0 | 0 | 0 |
| 2 | 1 | 1 | 0 | 0 | 0 |
| 3 | 0 | 1 | 0 | 0 | 0 |
| 4 | 0 | 1 | 1 | 0 | 0 |
| 5 | 1 | 1 | 1 | 0 | 0 |
| 6 | 1 | 0 | 1 | 0 | 0 |
| 7 | 0 | 0 | 1 | 0 | 0 |
| 8 | 0 | 0 | 1 | 1 | 0 |
| 9 | 1 | 0 | 1 | 1 | 0 |
| 10 | 1 | 1 | 1 | 1 | 0 |
| 11 | 0 | 1 | 1 | 1 | 0 |
| 12 | 0 | 1 | 0 | 1 | 0 |
| 13 | 1 | 1 | 0 | 1 | 0 |
| 14 | 1 | 0 | 0 | 1 | 0 |
| 15 | 0 | 0 | 0 | 1 | 0 |
| 16 | 0 | 0 | 0 | 1 | 1 |
FIG. 2
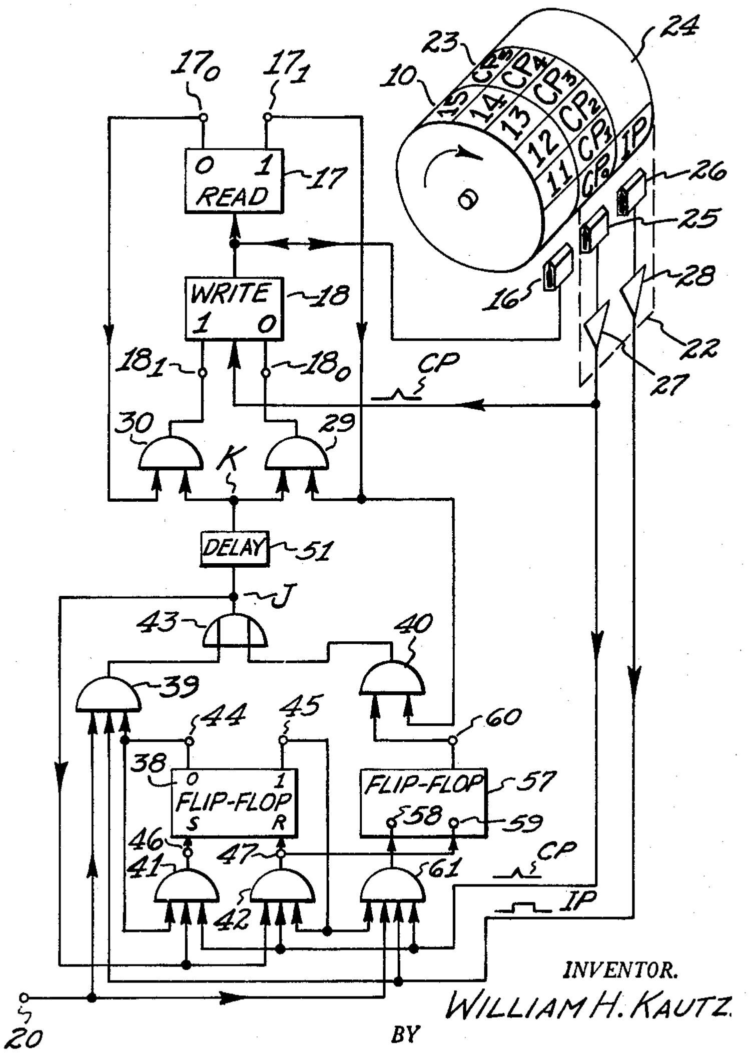
FIG. 3
INVENTOR.
WILLIAM H. KAUTZ
BY

INVENTOR.
WILLIAM H. KAUTZ.
BY

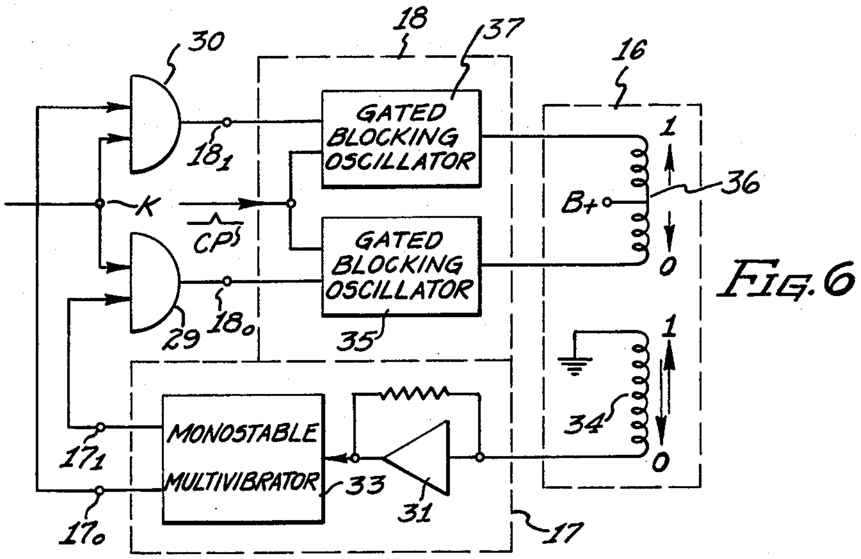
FIG. 6
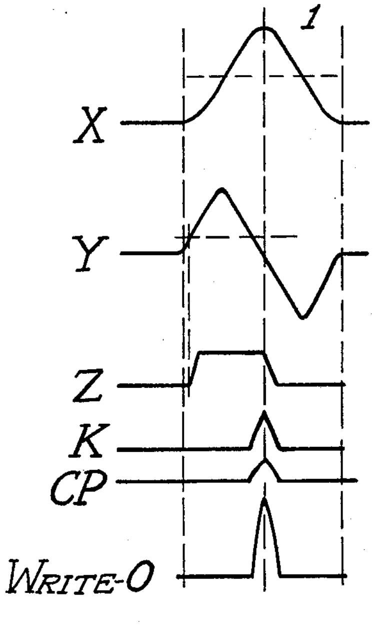
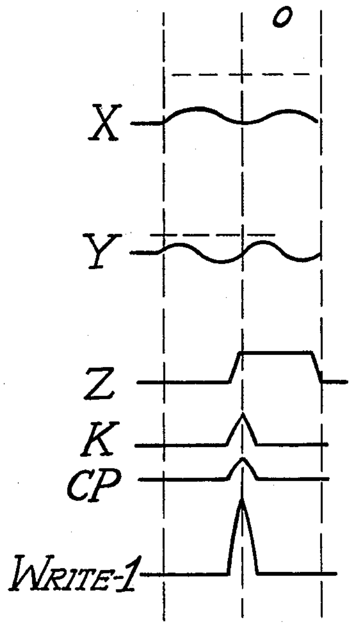
FIG. 7 FIG. 8
INVENTOR.
WILLIAM H. KAUTZ.
BY
[signature]

3,119,929
Patented Jan. 28, 1964

3,119,929

HIGH CAPACITY ACCUMULATOR

William H. Kautz, Palo Alto, Calif., assignor to General Electric Company, a corporation of New York Filed May 11, 1960, Ser. No. 28,361
3 Claims. (Cl. 235—176)

This invention relates generally to a high capacity accumulator employing a moving magnetic medium for storing very large binary coded numbers.

In many uses of computers, it is necessary to provide an accumulator having a high capacity. Most accumulators employ a plurality of cascaded bistable elements, such as electronic flip-flops, as a memory device to store a binary digital number. Such an accumulator having a number $n$ of cascaded bistable elements may assume $2^n$ different stable conditions. For instance, a circuit having four bistable elements may assume $2^4=16$ different aggregate stable conditions, and, therefore, may represent only 16 different numbers.

To increase the capacity of any given accumulator, it is necessary to increase the number of its bistable storage elements. The cost of additional elements in money, space and operating power may be prohibitive for many applications if electronic flip-flop elements are used. Furthermore, to increase the speed of operation it is frequently necessary to provide additional control elements or more powerful operating components.

An object of the present invention is to provide a high capacity accumulator with a minimum number and complexity of components.

Another object is to provide an accumulator having a capacity which may be economically increased to meet all conceivable requirements without increasing the number of operating components.

Still another object is to provide an accumulator system for serially reading from a rotating magnetic memory the binary digits of an augend and for recording the sum of the augend and an addend in the same cells of the rotating magnetic memory from which the augend is read during one revolution of the memory.

In one illustrative embodiment of this invention a series of cells on a track of a rotating magnetic medium, such as a drum, is used as binary digital storage elements. The track may be divided into the number of cells necessary to provide the desired capacity or, preferably, into as many cells as practicable, wherein only the required number of cells is employed for the accumulator. Thus, a typical drum circulating memory may have forty or more cells per inch of track, so that there is usually no need to employ the entire track for a single accumulator register. A synchronizing index pulse recorded on another track of the same drum serves to locate or identify the first accumulator cell, which stores the least significant binary digit, or bit, of the number. The stored number is represented by the reflected binary code, to be described later. The center of each cell is determined by a synchronizing clock pulse recorded on a third track of the same drum. The accumulator track is continuously rotated past an electromagnetic transducer for sensing the bits stored in the respective cells. During each cycle of rotation, the transducer may alter the binary coded numbed number represented by the recorded bits by sensing the stored bits and altering their configuration in accordance with the reflected binary code. A circuit electrically connected to the transducer controls the recordation or alteration of the bits. The operation of sensing is also referred to as reading and the operations of recording or altering a bit stored in a given cell are also referred to as writing.

Other objects and advantages will become apparent from the following description with reference to the drawings in which:

FIG. 1 illustrates a functional block diagram of the present invention;

FIG. 2 is a table of the reflected binary code for representing numbers;

FIG. 3 is a schematic diagram of an embodiment of the present invention;

FIG. 6 is a schematic diagram of the read and write circuits in the embodiments illustrated in FIGS. 3 and 4;

Figures 4, 5:
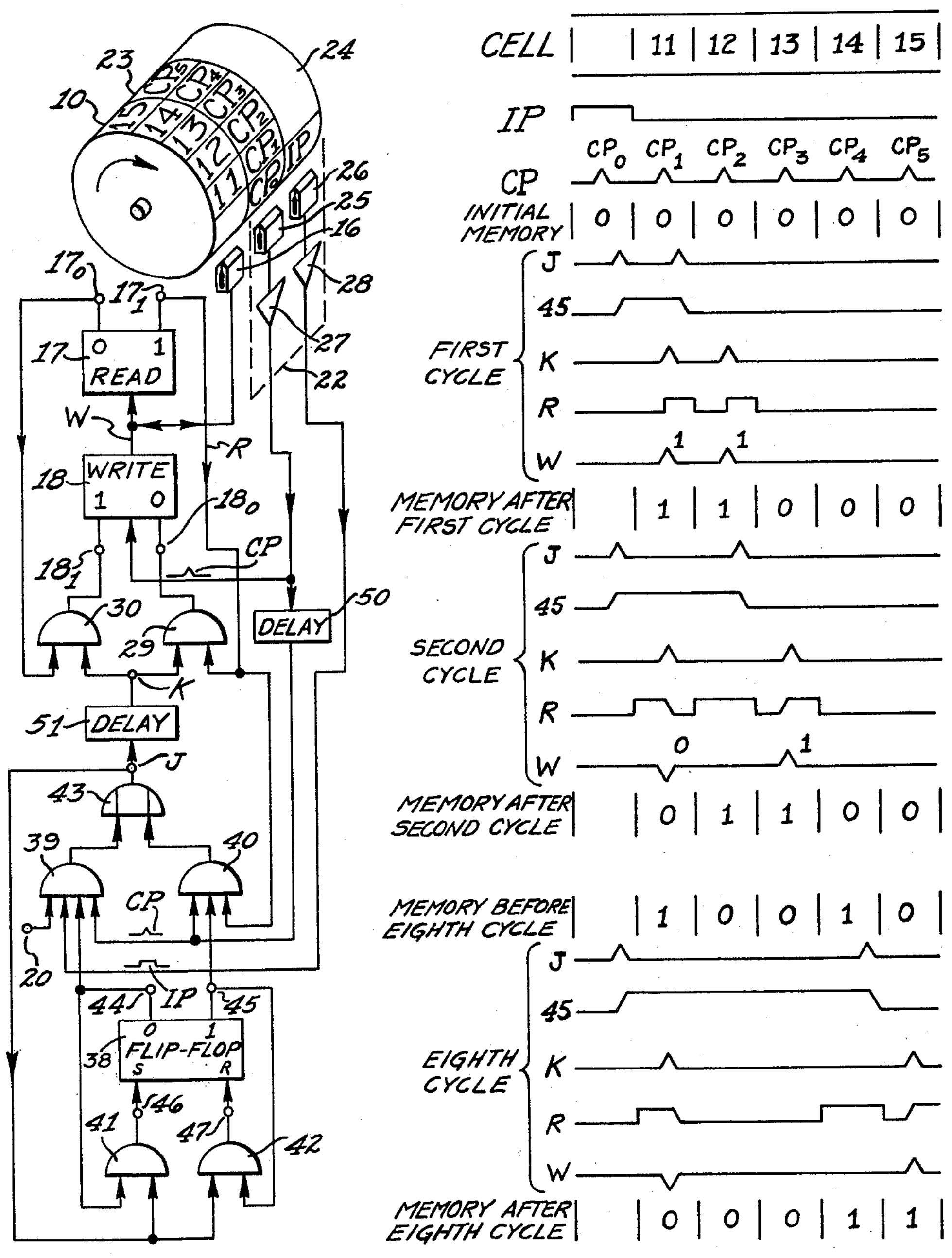
FIG. 4 is a schematic diagram of another embodiment of the present invention.
FIG. 5 is a timing diagram for the embodiment illustrated in FIG. 4.

FIG. 7 is a timing diagram for the operation of altering a recorded bit 1 to a bit 0 with the circuits of FIG. 6; and FIG. 8 is a timing diagram for the operation of altering a recorded bit 0 to a bit 1 with the circuits of FIG. 6.

The concept of the present invention is best illustrated by the functional block diagram in FIG. 1. A rotating magnetic medium 10 is provided for storing a binary coded number having as many binary digits as desired. For convenience, a sequence of only five binary storage cells 11 to 15 are shown. These cells are schematically illustrated by circles arranged in a closed loop. It should be understood that, in accordance with the principles of this invention, any number of binary storage cells may be provided and that, of the number provided, any group may be employed so long as they are identifiably arranged in sequence.

For the purpose of illustration, such a rotating magnetic medium may be considered as analogous to a Ferris wheel. When the volume of expected business is low, the Ferris wheel operator will employ only a portion of the available seats, these seats being selected either in successive order or in some other sequential order, such as every other one. When the business volume increases, a larger number of seats will be pressed into service. It is preferable that the selected mode of operation be uniform regardless of the number of seats employed. The binary digits, bit 0 and bit 1, stored in the cells 11 to 15, may be broadly compared to the absence and presence of passengers in the seats. Unlike the Ferris wheel, however, the rotating magnetic medium is never stopped during operation. Instead, the content of each cell is sensed and may be altered by access circuitry as it is passing a transducer.

The access circuitry is connected to an electromagnetic transducer 16 positioned adjacent to the rotating magnetic medium. The access circuitry consists of a read circuit 17 and a write circuit 18. The transducer 16 senses the bit stored in a given cell and applies a corresponding signal to the read circuit 17, and then, if appropriate, the transducer alters that bit in response to a signal from the write circuit 18, both sensing and altering occurring during the same cell period. A cell period is defined as the time required for a cell to be scanned by the transducer. A cell is defined as that portion of the rotating magnetic medium allotted for the storage of a single binary digit.

The write circuit 18 is controlled by an operating circuit 19, which is electrically connected to the write circuit at one of its terminals and at another one of its terminals to the read circuit 17. The operating circuit must determine, on the basis of a signal received from the read circuit 17 and in accordance with a predetermined rule, whether the bit stored in the cell passing the transducer should be altered. The bit in a cell is altered by changing a 0 therein to a 1, or a 1 therein to a 0. Altering a binary digit may also be referred to as inverting the digit.

The operating circuit 19 functions in response to a control signal received at an input terminal 20, this control signal being received from control circuits or a manually operated start switch, for example. A cycle indexing circuit 21 translates the control signal to the operating circuit 19 in such a manner as to synchronize the operating circuit with the rotating magnetic medium 10. An index and clock pulse source 22 provides the requisite synchronizing signals. An index pulse IP is applied to the cycle indexing circuit 21 to signal the time when the first memory cell 11 is to be read. Each of a plurality of clock pulses CP is applied to the write circuit 18 to signal the time when the center of a respective cell is adjacent to the transducer 16. The clock pulses CP are also applied to the cycle indexing circuit to synchronize the indexing operation with the scanning of the center of the memory cells.

During operation of the equipment, a plurality of binary digits arranged to represent a number in accordance with a predetermined code is stored in the binary cells 11 to 15. The aggregate configuration of this succession of binary digits represents a particular one of the possible numbers which may be stored in the five cells. When a control signal is received at input terminal 20, the cycle indexing circuit 21, under control of the index pulse, translates that control signal to the operating circuit 19 in synchronism with the beginning of the next cycle of the rotating magnetic medium 10. At that time the transducer 16 begins to sequentially sense the bits stored in the cells 11 to 15. The read circuit 17 transmits the bit signals from transducer 16 to the operating circuit 19. The latter, in turn, directs the write circuit 18 to alter certain bits, in accordance with a predetermined rule, while the bits are being sensed by transducer 16, in order that the number represented by the configuration of binary digits stored in the cells may be increased. The binary code representing the number stored is preferably a code which may be derived by the simplest rule possible, in order that the implementation of the operating circuit 19 may be as simple as possible.

A suitable binary code for representing numbers will now be described with reference to the table of FIG. 2. For simplification of this description, only seventeen unique configurations are shown in the table of FIG. 2 for five binary cells, although five cells may assume $2^5=32$ stable configurations. The cells 11 to 15 are indicated at the top of the table with order of increasing significance from left to right. The stable state of each cell tabulated for seventeen stable configurations is indicated by a bit 0 or a bit 1 in the column below the corresponding cell. The seventeen configurations shown and the fifteen possible configurations not shown are developed according to the following two predetermined rules: to increase the represented number by one, (1) if the number represented is even, invert the lowest order binary digit (that stored in cell 11), and (2) if the number represented is odd, invert the binary digit next following the bit 1 of lowest order in the number. These rules are implemented by reading the cells from left to right in the table of FIG. 2.

The binary code developed by this simple rule is often referred to as the reflected binary code to distinguish it from the conventional binary code. A derivation of this reflected binary code is given by Montgomery Phister, Jr., at pages 399 to 401 of Logical Design of Digital Computers, John Wiley and Sons, Inc., New York (1958). The advantage of employing the reflected binary code to represent numbers is that the stable configuration of $n$ cells for a given number differs from that for the preceding number in only one bit order. There is one other feature that should be noted: the code for $n$ bit orders does not return to zero in response to the $2^n$th unit accumulated, although a bit 1 carry is propagated at this time to signal that the capacity of the $n$ bit orders has been exceeded.

By employing the reflected binary code to represent numbers, implementation of the operating circuit 19 of FIG. 1 for a units accumulator is relatively economical, since only one bit position is altered for each unit added. Therefore, the reflected binary code has been selected for both specific embodiments of the present invention illustrated in FIGS. 3 and 4. It should be recognized, however, that the concept of this invention is not limited to the illustrated embodiments nor to embodiments which employ the reflected binary code.

In the embodiment of FIG. 4, which will be described first, a track 10 is provided on a rotating magnetic drum. The means for driving the drum in the direction indicated is not illustrated, but the provision of a drive mechanism which will rotate the drum at a constant speed may be readily provided by persons skilled in the art. The drum includes two other tracks 23 and 24 which, together with their associated electromagnetic transducers 25 and 26, constitute the index and clock pulse source 22 of FIG. 1.

Transducers 16, 25 and 26 are conventional magnetic heads. Each consists of a ring of soft ferromagnetic material having a small gap at the point where the reading or writing takes place, i.e., at the point place adjacent the magnetic drum surface. Each transducer has a reading coil wound around its body and transducer 16 has additionally a center-tapped coil wound around its body for writing, since transducer 16 is employed for writing as well as reading, in a manner to be described with reference to FIG. 6. Each transducer provides a signal train representing the bits read thereby.

The rotating magnetic memory is again illustrated as having only five cells 11 to 15. Each cell is a segment or elemental area of the circular track 10 on the periphery of the mangetic drum, the cylindrical surface of which has been evenly coated with magnetizable material. A bit 0 or 1 may be recorded in a given cell by magnetizing the surface of the drum in that segment to saturation in one of two predetermined directions, one direction being arbitrarily selected to represent the bit 0. In operation, each cell stores a bit 0 except when a bit 1 is recorded therein. Before an accumulating operation commences, the memory track 10 is prepared by premagnetizing all of the cells in the direction or polarity arbitrarily selected to represent a bit 0. Thereafter, to write a bit 1 in a given cell, a short pulse of current is passed through the electronmagnetic transducer 16 when its gap is adjacent the center of the cell in order to magnetize most of the cell to saturation in the opposite direction. A bit 1 stored in a given cell may be similarly altered to a bit 0 by magnetizing most of the segments to saturation in the bit 0 direction. This type of digital magnetic drum recording is commonly referred to as the return-to-zero mode.

Since most of the cell is saturated when a bit is recorded therein, although the recording action is timed to occur when the transducer has scanned to the cell center, the bit recorded may be read during a subsequent pass before the transducer reaches the cell center. Consequently, it is possible to sense the contents of a cell and, in response to the cell contents to alter the bit stored therein during a single cell period.

The clock pulse track 23 which passes immediately beneath transducer 25 is provided for storing timing pulse bits $CP_0$ to $CP_5$ in six of its cells, as indicated by the legends $CP_0$ to $CP_5$ in FIG. 4. Those timing pulse bits are sensed by the transducer 25, which provides pulses representing the bits sensed thereby. These pulses are amplified by an amplifier 27, which is so designed that each one of the positive pulses $CP_0$ to $CP_5$, illustrated in a graph of FIG. 5, is produced when transducer 16 is opposite the center of a corresponding one of six cells in the memory track 10, namely the cells 11 to 15 and the cell immediately preceding cell 11.

The index pulse track 24 which passes immediately beneath transducer 26 is provided for storing an indicator or index pulse bit IP. This pulse bit is sensed by the transducer 26 as the magnetic drum rotates, transducer 26 providing a pulse representing the bit sensed thereby. This pulse is amplifier by an amplifier 28, which is so designed that a long positive IP pulse is produced from approximately the time that transducer 25 begins scanning the cell in which the $CP_0$ pulse is recorded until about the time that transducer 25 has scanned to the end of the $CP_0$ cell. The exact timing of the leading and trailing edges of the IP pulse is not critical.

The three transducers 16, 25 and 26 are illustrated as being positioned in a line parallel to the axis of rotation of the magnetic drum. Consequently, all of the cells which are to be scanned simultaneously are in a rectangular area which is often referred to as a slot. However, in actual practice it is more expedient to stagger the heads and advance the cells in the associated tracks, so that cells which are to be scanned simultaneously pass simultaneously beneath the respective staggered transducers. The cells of a given slot are then no longer in a rectangular area but may still be referred to as cells of a given slot because the time relationship between them remains the same.

The read circuit 17 amplifies the signals induced in the transducer 16 by the recorded bits in the cells 11 to 15 and produces complementary output signals at terminals $17_0$ and $17_1$. When a bit 1 is sensed, the output terminal $17_1$ is driven relatively positive for one-half of a cell period. While a bit 0 is being sensed, the output terminal $17_0$ remains at a relatively positive potential.

Output terminal $17_1$ enables a logic AND gate 29 when it is positive and output terminal $17_0$ enables a logic AND gate 30 when AND gate 29 is not being enabled by terminal $17_1$. Accordingly, any positive signal at a junction K is normally transmitted by the AND gate 30, but when a bit 1 is being sensed, it is transmitted by AND gate 29.

The output terminals of the AND gates 29 and 30 are connected to respective input terminals $18_0$ and $18_1$ of the write circuit 18 to control the write-bit-zero and write-bit-one operations, respectively. The write circuit is synchronized by a clock pulse and writes either a 0 or a 1 in a given cell depending on which of AND gates 29 and 30 is transmitting a positive signal at the time the clock pulse occurs. It should be understood that the polarity of the signals which operate the write circuit has been arbitrarily selected, just as the polarity of a signal which represents a bit 1 has been arbitrarily selected to be positive with respect to some reference potential. The logic of the read and write circuits may be implemented in a variety of different ways, one of which will now be described.

The read circuit 17 will be described first with reference to FIG. 6 and the graphs of FIG. 7. The write circuit 18 will then be similarly described with reference to FIG. 6 and the graphs of FIG. 7. The graphs of FIG. 7 illustrate for the operation of reading a bit 1 and writing a bit 0 in a cell during the one cell period.

The read circuit 17 consists of a sensitive direct-coupled amplifier 31 coupled to a monostable multivibrator 33 having complementary output terminals $17_1$ and $17_0$. The magnetic flux distribution of a cell having a bit 1 recorded therein is shown in a graph X of FIG. 7. When transducer 16 scans such a cell, a signal is induced in the read coil 34 thereof and, in turn, is amplified by amplifier 31. The general form of the output signal of amplifier 31 is illustrated in a graph Y of FIG. 7. When that signal of graph Y reaches a predetermined threshold level, monostable multivibrator 33 is triggered from its stable condition, which is the condition wherein terminal $17_0$ is relatively positive, to its unstable condition, wherein terminal $17_1$ is relatively positive. This unstable condition persists for approximately one-half of a cell period.

Graph Z of FIG. 7 illustrates the signal provided by terminal $17_1$. If a positive signal is now present at junction K when the center of the cell is scanned, as illustrated in a graph K of FIG. 7, AND gate 29 transmits a positive potential to the write-zero input terminal $18_0$ of the write circuit 18.

The write circuit 18 includes a gated blocking oscillator 35 serially connected between the write-zero input terminal $18_0$ and one-half of the center tapped write coil 36 of transducer 16. Another gated blocking oscillator 37 is serially connected between the write-one input terminal $18_1$ and the other half of coil 36. A clock pulse CP, from the clock pulse amplifier 27 (FIG. 4), is applied to each of the gated blocking oscillators and triggers whichever blocking oscillator may be enabled when the center of the cell is being scanned. In this instance, the CP pulse illustrated in a CP graph of FIG. 7 triggers the blocking oscillator 35, which is enabled by a positive potential from the logic AND gate 29.

When blocking oscillator 35 is triggered, a large pulse of current is received from a source B+ connected to the center tap of the coil 36, whereby magnetic lines of force are set up to establish a magnetic field of one polarity across the gap of the transducer 16. Thus, during a single cell period, a bit 0 is written in the same cell from which a bit 1 was read. The pulse of current through one-half of coil 36 is illustrated in a Write-0 graph of FIG. 7. It should be noted that since a bit 0 is written in the cell during the cell period illustrated in FIG. 7, the magnetic flux distribution in the entire cell during the last half of the cell period has been altered to the configuration illustrated in a graph X of FIG. 8. Thus, transducer 16 records the bit 0 configuration over the first half of the cell as well as over the last half of the cell at the instant that the clock pulse is applied. This is made possible by the high current pulse in transducer 16, which establishes a saturating magnetic field that almost reaches to the extremities of the cell.

Consider, now, that transducer 16 scans a cell wherein a bit 0 had been previously stored. The magnetic flux distribution in such a cell is shown in the graph X of FIG. 8. (The bit 0 configuration shown is that for a cell wherein a bit 1 had been previously inverted to a bit 0, as previously described with reference to FIG. 7.) The cell is scanned by transducer 16, and a signal is induced in the coil 34 and amplified by amplifier 31. The amplified signal, which is shown in a graph Y of FIG. 8, does not reach the threshold level necessary to trigger the monostable multivibrator 33, so that the read-zero terminal $17_0$ remains at a relatively positive potential. Graph Z of FIG. 8 illustrates the complementary signal provided by terminal $17_1$. The logic AND gate 30 remains enabled and transmits a positive signal upon the occurrence of a positive pulse at junction K to enable the gated blocking oscillator 37. The clock pulse CP applied while the center of the cell is being scanned triggers blocking oscillator 37 and a large pulse of current, as shown in the Write-1 graph of FIG. 8, is received from the source B+ connected to the center tap of the coil 36, whereby a bit 1 is written in the cell. Concurrently, the Write-1 pulse induces a signal in the coil 34 of sufficient amplitude to trigger the monostable multivibrator 33 to its unstable condition for the remaining half of the cell period after, as indicated in graph Z of FIG. 8. Thus, transducer 16 reads a bit 0 while the first half of the cell is scanned, records a bit 1 when opposite the center of the cell and effects the triggering of multivibrator 33 when the bit 1 is recorded.

A circuit diagram of such a system for reading and writing in the same cell period is disclosed and described by J. H. McGuigan in "Combined Reading and Writing on a Magnetic Drum," published in the Proceedings of the IRE, October 1953, volume 41, at pages 1438 to 1444.

The operation of the cycle indexing and operating circuits in FIG. 4 will now be described in detail. The cycle indexing circuit consists of a control flip-flop 38, two control AND gates 39 and 40, and two steering AND gates 41 and 42. AND gates 41 and 42 are connected to the output terminals of AND gates 39 and 40 through an OR gate 43. Flip-flop 38 has two complementary output terminals 44 and 45. The reset or false output terminal 44 is connected to the control AND gate 39 and to the steering AND gate 41. The latter is connected to a set input terminal 46 of the flip-flop. The set or true output terminal 45 is connected to the control AND gate 40 and to the steering AND gate 42. The latter is connected to a reset input terminal 47 of the flip-flop. A suitable flip-flop may be selected from art including such flip-flops as discussed by J. Millman and H. Taub in Chapter Five of Pulse and Digital Circuits (1956). Suitable AND gates and OR gates may be similarly selected from art including gates presented by Millman and Taub in Chapter Thirteen of the aforesaid book.

In the initial or starting condition, flip-flop 38 is reset and output terminal 44 is relatively positive. When a positive signal is applied to the control AND gate 39 from the control input terminal 20, AND gate 39 is primed or enabled. When so enabled, AND gate 39 requires only an index pulse and its coincident clock pulse $CP_0$ at the third and fourth input terminals thereof in order to transmit a positive signal. The index pulse is delivered by index pulse amplifier 28 at the beginning of the next cycle of the memory track 10. It should be noted that the index pulse occurs before the first cell 11 of the memory track 10 is scanned, as indicated by an IP graph of FIG. 5. The clock pulse $CP_0$ is delivered by clock pulse amplifier 27 when the center of the cell preceding cell 11 is being scanned, as indicated by the CP graph of FIG. 5. The clock pulses applied to AND gates 39 and 40 are delayed for an interval approximately equal to the clock pulse duration by a delay element 50.

The clock pulses transmitted through AND gate 39 pass through OR gate 43 to a junction J, located between the OR gate 43 and the steering AND gates 41 and 42. The clock pulses at junction J are shown in a graph J of FIG. 5. The $CP_0$ clock pulse arriving at junction J causes AND gate 41 to transmit a positive signal, since AND gate 41 is enabled at this time by the reset terminal 44 of flip-flop 38. The signal thus gated to the set input terminal 46 of flip-flop 38 triggers it to its other stable condition. Its set output terminal 45 is then relatively positive, and control AND gate 40 is enabled.

The signal at the junction J is also transmitted through a delay element 51 to junction K and AND gates 29 and 30. Delay element 51 introduces a delay having a duration equal to one cell period less the duration of the delay of delay element 50. Accordingly, the respective delay durations of the delay elements 50 and 51 are approximately one-fifth and four-fifths of a cell period. Suitable delay elements may be selected from the art as represented by Millman and Taub in Chapter Ten of the book referred to hereinbefore.

The first clock pulse $CP_0$ reaches junction K when the center of the next cell is being scanned, because of the cumulative delays of delay elements 50 and 51. In the initial condition of the memory track 10 a bit 0 is recorded in each cell. Therefore, when cell 11 is sensed during the first operating cycle, the output terminal $17_0$ of the read circuit 17 is relatively positive while the first half of cell 11 is being scanned. Consequently, AND gate 30 is enabled and a positive signal is transmitted to input terminal $18_1$ when transducer 16 is adjacent the center of cell 11. The clock pulse $CP_1$ (FIG. 5), which occurs at that time, triggers the write circuit 18 and a bit 1 is written into cell 11 in the manner described with reference to FIGS. 6 and 8. The Write-1 pulse which records the bit 1 immediately triggers the read circuit 17, whereby output terminal $17_1$ is driven positive enabling AND gates 29 and 40. AND gate 29 does not transmit a signal, however, because a pulse is no longer present at the junction K as the second half of cell 11 is being scanned.

The clock pulse $CP_1$, which triggered write circuit 18, is also transmitted through the delay element 50 and applied to the control AND gate 40 one-fifth of a cell period later. This delay clock pulse $CP_1$ gates a positive signal from the terminal 45 through AND gate 40 and the junction J to the steering AND gate 42, which is enabled by the positive potential of the set output terminal 45. Accordingly, the steering AND gate 42 transmits a positive signal which resets the flip-flop 38 to its initial stable condition.

The second clock pulse $CP_1$ reaches junction K when the center of memory cell 12 is being scanned. At that time the output terminal $17_0$ of the read circuit is again positive because the zero recorded in the cell 12 is then being sensed. Accordingly, AND gate 30 delivers a positive signal to terminal $18_1$, so that upon the occurrence of clock pulse $CP_2$ (FIG. 5), a bit 1 is recorded in cell 12. The output terminal $17_1$ of the read circuit is again rendered positive. However, at this time the flip-flop is in its initial stable condition and the gate 40 is no longer enabled. Consequently, no further action occurs until the next index pulse occurs, and then only if a control signal is present at terminal 20.

A timing diagram for the first counting cycle which has just been described is shown in FIG. 5. The timing periods for the graphs are the periods of the cells of the circulating memory 10, as indicated at the top of the diagram. The CP graph shows the timing of the clock pulses $CP_0$ to $CP_5$ with respect to the cell periods and the first line below the CP graph shows the initial digits stored in each cell. The J, 45 and K graphs illustrate signals at points in FIG. 4 correspondingly designated. The W and R graphs illustrate the respective output signals from the write circuit 18 and the terminal $17_1$ of the read circuit 17.

The stable configuration of the memory cells after the first operating cycle has been completed is indicated in the line immediately following the W graph. By comparing this configuration with the third line in the table of FIG. 2, it can be seen that in the embodiment of FIG. 4 the number stored is advanced by two in response to a control signal during a single operating cycle. The control signal is synchronized by the index and clock pulses to initiate the operating cycle. The first step of this operating cycle is to invert the digit in cell 11 and the second step is to alter the first cell following the first cell storing a bit 1 (cell 11), thereby increasing the coded number stored from zero to two.

During the second operating cycle, which is shown in the second set of graphs in FIG. 5, the first step is again repeated and the bit 1 stored in cell 11 is read and altered to a bit 0. Since a bit 0 is now recorded in the cell 11, the first cell storing a bit 1 is not encountered until the cell 12 is read. Accordingly, shortly after the center of the cell 12 is scanned, a delayed $CP_2$ pulse is presented at junction J and the flip-flop 35 is reset, as indicated by the graph 45. At the center of the next cell period (cell 13) a positive pulse is presented at junction K and transmitted through the AND gate 30, which is enabled by the bit 0 signal obtained by reading the cell 13. The clock pulse $CP_3$ which occurs while the center of cell 13 is being scanned triggers write circuit 18 to write a bit 1 as indicated in the W graph. Thus, the coded number stored in the memory cells is increased from two to four in response to a control signal initiating the second operating cycle.

Each operating cycle is completed during one drum revolution. However, several drum revolutions may occur before the next operating cycle is initiated. For each operating cycle, it is only necessary that each control signal occur during the presence of an index pulse. Since the duration of one drum revolution is normally very short, a control signal of moderate duration will overlap the index pulse, regardless of when initiated. To insure this, however, a monostable multivibrator may be used to adjust all control signals to a uniform duration equal to one drum cycle.

The embodiment illustrated in FIG. 4 may also be operated in another mode by applying a continuous control signal to the gate 39. In that mode of operation two units are added to the coded number stored during each memory cycle so long as the control signal is present. Such a mode of operation is useful for accumulating a total number of half memory cycles or for measuring the total time during which the control signal is present.

This embodiment may also be used as a scaler. However, as indicated hereinbefore, the reflected binary code does not return to zero when the capacity of the accumulator has been reached. Therefore, to operate this embodiment as a scaler one of the cells may be employed to store a scaler output, which may then be used to reset the circulating memory to its initial condition. Accordingly, in the illustrated embodiment of FIG. 4, memory cell 15 may be employed to store a carry signal produced during the eighth operating cycle when the number stored in the cells 11 to 14 is increased from fifteen to sixteen as indicated in the last line of the table of FIG. 2 and in the graphs for the eighth cycle of operation shown in FIG. 5. Since this embodiment increases the number stored by two in response to control signal pulses, the number stored must later be divided by two in order to obtain the true number of control signal pulses recorded. Alternatively, the control signal pulses may be divided by two before they are recorded. Such division may be conveniently accomplished by placing a binary circuit between the input terminal 20 and the AND gate 39. Such a binary circuit may consist of a flip-flop and two steering AND gates in a combination similar to that of flip-flop 38 and AND gates 41 and 42.

FIG. 3 is a modification of the embodiment in FIG. 4, being designed to accumulate units by increasing a reflected binary coded number in increments of one according to the following rules: to increase the number stored, invert the bit stored in cell 11, if the present stored number is even; and invert the bit stored in the cell next following the lowest order cell storing a bit 1, if the present stored number is odd. As noted hereinbefore, this is precisely the rule by which the reflected binary code in the table of FIG. 2 is generated.

The embodiment of FIG. 3 includes an additional flip-flop 57 having set and reset input terminals 58 and 59, respectively. A true or set output terminal 60 is connected to an input terminal of the control AND gate 40. The clock pulses from the amplifier 27 are applied directly to the steering AND gates 41 and 42. The clock pulses are also applied to an AND gate 61 connected to the set input terminal 58 of flip-flop 57. The enabling potentials for AND gate 61 are obtained from the set output terminal 45 of flip-flop 38, the control signal input terminal 20, and the index pulse amplifier 28. When all of these enabling potentials are present, a clock pulse $CP_0$ is gated through to the set input terminal 58 of the flip-flop 57.

For the purpose of explaining the circuit operation of this embodiment, it will be assumed that a control signal pulse is received for each successive index pulse. In actual practice several index pulses may occur between control signal pulses, in which case it is only necessary to insure that each control signal pulse overlap one index pulse. In the initial or starting condition, flip-flops 38 and 57 are reset and a bit 0 is stored in all of the cells 11 to 15. The first index pulse produces a pulse at junction J through control AND gate 39 and OR gate 43. This pulse enables AND gate 41 whereupon flip-flop 38 sets upon the occurrence of the clock pulse $CP_0$. One full cell period later, the pulse at junction J is applied to junction K, after delay by the delay element 51, which here has a time delay of one complete cell period. The bit 0 stored in the first cell is thereupon inverted to a bit 1 by write circuit 18. The read circuit 17 immediately responds the Write-1 pulse, but logic AND gate 29 and the control AND gate 40 are not enabled so that no further action occurs.

The second index pulse enables AND gate 61, which transmits the coincident clock pulse $CP_0$ to set the flip-flop 57, thereby enabling the control AND gate 40. No action occurs until the first cell storing a bit 1 is sensed, which in this second drum cycle is the cell 11 into which a bit 1 was written during the first cycle of operation. The bit 1 signal from terminal $17_1$ of the read circuit 17 is transmitted through the enabled AND gate 40, OR gate 43, and AND gate 42 to reset both of flip-flops 38 and 57, upon the occurrence of the next clock pulse $CP_1$. This same bit 1 signal is applied to the junction K one full cell period later, while the center of the cell 12 is being sensed. Since the cell 12 is storing a bit 0, AND gate 30 is enabled. The clock pulse $CP_2$ thereupon triggers write circuit 18 to cause a bit 1 to be written in cell 12.

Accordingly, in response to the second unit added, the number stored in reflected binary code is increased from 10000 to 11000 to represent the number 2, as indicated in the table of FIG. 2. The subsequent odd units added such as the third and fifth units produce the same operation as the first unit added, namely, the alteration of the first cell. Similarly, subsequent even units added, such as the fourth and sixth units produce the same operation as the second unit added, namely, the alteration of the cell next following the lowest order cell storing a bit 1.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. An accumulator comprising a rotating magnetic drum for storing a plurality of binary digits representing a number in a circular track thereof, a transducer disposed for sensing the binary digits stored in said track as said drum rotates and for providing a signal train representing the digits sensed thereby, means responsive to said signal train for providing a first signal during first alternate revolutions of said drum and a second signal during second alternate revolutions of said drum, first means responsive to said first signal for modifying the configuration of the digits stored in said track if a first digital condition exists, and second means responsive to said second signal for modifying the configuration of the digits stored in said track in a different manner if a second different digital condition exists.

2. An accumulator comprising a rotating magnetic drum for storing a plurality of binary digits representing a number in a circular track thereof, a transducer disposed for sensing the binary digits stored in said track as said drum rotates and for providing a signal train representing the digits sensed thereby, means responsive to said signal train for providing a first signal during first alternate revolutions of said drum and a second signal during second alternate revolutions of said drum, first means responsive to said first signal for inverting the lowest order digit of said number in said track if a first digital condition exists, and second means responsive to said second signal for inverting the digit in said track next following the first digit of a predetermined type therein if a second digital condition exists.

3. An accumulator comprising a rotating magnetic drum having thereon a plurality of data storage cells in a circular track for storing a corresponding plurality of binary digits and having thereon an indicator of a particular one of said cells, a first transducer disposed for sensing the binary digits stored in said track as said drum rotates and for providing a signal train representing the digits sensed thereby, a second transducer disposed for sensing said indicator as said drum rotates and for providing a corresponding indicator signal, means responsive to said signal train for providing alternately a first signal and a second signal, first means enabled by the receipt of said first signal and said indicator signal for inverting the digit stored in said one cell if it is of a predetermined type in response to said signal train, and second means enabled by receipt of said second signal for inverting the digit in said track next following the first digit therein in response to said signal train if said first digit is of another predetermined type.

References Cited in the file of this patent

UNITED STATES PATENTS

| | | |
|---|---|---|
| 2,700,148 | McGuigan et al. | Jan. 18, 1955 |
| 2,855,146 | Henning et al. | Oct. 7, 1958 |
| 2,881,979 | Blundi | Apr. 14, 1959 |
| 2,917,236 | Reisch | Dec. 15, 1959 |
| 2,922,577 | Cignetti et al. | Jan. 26, 1960 |
| 2,931,572 | Dirks | Apr. 5, 1960 |
| 2,963,223 | Coobe-Yarborough | Dec. 6, 1960 |
| 3,020,481 | Hulst | Feb. 6, 1962 |